(12) United States Patent
Kawasaki et al.

(10) Patent No.: US 7,876,455 B2
(45) Date of Patent: Jan. 25, 2011

(54) THREE-DIMENSIONAL SHAPE MEASURING METHOD AND APPARATUS FOR THE SAME

(75) Inventors: Hiroshi Kawasaki, Saitama (JP); Ryo Furukawa, Hiroshima (JP)

(73) Assignee: TechnoDream21 Co., Ltd., Saitama (JP)

( * ) Notice: Subject to any disclaimer, the term of this patent is extended or adjusted under 35 U.S.C. 154(b) by 306 days.

(21) Appl. No.: 11/659,099

(22) PCT Filed: Aug. 3, 2004

(86) PCT No.: PCT/JP2004/011406

§ 371 (c)(1),
(2), (4) Date: Oct. 21, 2008

(87) PCT Pub. No.: WO2006/013635

PCT Pub. Date: Feb. 9, 2006

(65) Prior Publication Data

US 2009/0040532 A1 Feb. 12, 2009

(51) Int. Cl.
*G01B 11/24* (2006.01)

(52) U.S. Cl. ........................ 356/607; 356/602

(58) Field of Classification Search ........................ None
See application file for complete search history.

(56) References Cited

U.S. PATENT DOCUMENTS 4,801,207 A * 1/1989 Williams ..................... 356/606

(Continued)

FOREIGN PATENT DOCUMENTS

JP           A 08-086616           4/1996

(Continued)

OTHER PUBLICATIONS

Szeliski, Richard and Sing Bing Kang, Recovering 3D Shape and MOtion from Image Streams using NOn-Linear Least Squares, Digital Equipment Corporation, Cambridge Research Lab, Mar. (1993).*

(Continued)

*Primary Examiner*—Gregory J Toatley
*Assistant Examiner*—Rebecca C Slomski
(74) *Attorney, Agent, or Firm*—Oliff & Berridge, PLC

(57) ABSTRACT

A three-dimensional shape measuring apparatus includes a line laser light source (1) and an image capturing device (2). A three-dimensional shape measuring method and apparatus is characterized by irradiating a line laser beam to an object (3) to be measured from a laser projecting device, imaging points (6) irradiated with the laser beam by the image capturing device (2, detecting points on taken images as intersections (8), each of the points being detected from the taken images and being detected as a common point where line laser beams pass, deriving equations including the positions of the laser planes and the three-dimensional positions of the intersections as unknowns based on the detected intersections, determining the three-dimensional positions of the intersections and the positions of the laser planes by solving the derived equations as simultaneous equations, calculating by triangulation the three-dimensional positions of the points irradiated with the laser beams other than the intersections by using the positions of laser planes, and obtaining the three-dimensional shape of the object by repeating the series of processes.

21 Claims, 10 Drawing Sheets

U.S. PATENT DOCUMENTS

| | | | |
|---|---|---|---|
| 6,542,249 B1* | 4/2003 | Kofman et al. | 356/601 |
| 6,798,527 B2* | 9/2004 | Fukumoto et al. | 356/602 |
| 2006/0055943 A1* | 3/2006 | Kawasaki et al. | 356/606 |

FOREIGN PATENT DOCUMENTS

| | | |
|---|---|---|
| JP | 2003-130621 A | 5/2003 |

OTHER PUBLICATIONS

Izquiero, M.A.G., M.T. Sanchez, A Ibanez, and L.G. Ullate, Sub-pixel measurement of 3D surfaces by laser scanning, Sensors and Actuators 76 (1999) 1-8.*

Chang Woo Chu, Sungjoo Hwang and Soon Ki Jung, "Calibration-free Approach to 3D Reconstruction Using Light Stripe Projections on a Cube Frame," Third International Conference on 3DIM (2001), pp. 13-19.

Hiroshi Kawasaki, "Three-Dimensional Shape Measuring Method and its Device," U.S. Appl. No. 10/534,393, filed May 9, 2005.

* cited by examiner

THREE-DIMENSIONAL SHAPE MEASURING METHOD AND APPARATUS FOR THE SAME

FIELD OF THE INVENTION

The present invention relates to a 3D measurement apparatus which obtains the depths of the points on the target object using laser light and an image capturing device. Particularly, the present invention concerns a measurement apparatus which uses a single image capturing device and a laser projecting device whose location relative to the camera is unknown (which means extrinsic parameters are uncalibrated). The present invention also relates to a method in which the 3D shape of the target object is obtained using the above-mentioned 3D measurement apparatus.

BACKGROUND OF THE INVENTION

Known methods for active 3D measurement systems that uses laser light or halogen light sources are (1) light radar methods, (2) active stereo methods, (3) photometric stereo methods, (4) more topography methods, and (5) interference methods. Particularly, active stereo methods have been widely studied and commercialized because of their usefulness and accuracies.

Systems based on active stereo methods are composed of light sources (for example, lasers or halogen lamps) and image capturing devices (for example, cameras or CCDs). Since 3D shape acquisitions using active stereo methods are based on triangulations, the relative positions between the light sources and the image capturing devices should be known in advance (extrinsic calibrations). To realize this condition, the systems of active stereo methods often becomes large, heavy, and complicated.

If the relative locations between the light sources and the image capturing devices can be obtained easily, 3D shape acquisition systems can be simplified. Based on this idea, several methods have been proposed, for example, Japanese patent disclosure No. 2003-130621, in which the relative location of the light source from the image capturing device is obtained by capturing the markers attached on the light source at the same time.

If we can obtain the relative position between the image capturing device and the light source without either capturing markers or performing an extrinsic calibration, the system becomes more useful, and many of the disadvantages of the conventional active measurement systems can be overcome in terms of simplicity, portability, and inexpensiveness.

Patent documents 1: Japanese patent disclosure No. 2003-130621

DISCLOSURE OF THE INVENTION

Let us consider that a plane-shaped laser is reflected on the target object and this reflection is observed by a camera. Then, the laser reflection forms a curved line on the surface of the object. We will refer to this curved line as "line" (FIG. 1). The following are explanations of the 3D measurement algorithm, based on FIG. 2.

The process starts at step S20. We then project line laser beams from a laser projecting device (step S21) and the lines are extracted from the images captured by the image capturing device such as a camera (step S22). The intersections between the extracted lines either on the same image or on different images are detected (step S23).

In terms of the planes where the line laser beams exist (the laser plane) and the positions of the detected intersections, equations are constructed (step S24) and solved (step S25) as follows:

Let an equation of a laser plane be $$a*x+b*y+c*z+1=0,$$

where a, b, and c are the parameters of the plane, x, y, and z are the coordinates of the 3D points on the plane, and * represents a product operation.

A line of sight corresponds to a line which goes through both the point on a image plane and the origin of the camera coordinate system. Therefore, if the coordinate of the point on the image plane is (u, v) (the coordinate is assumed to be known), the line of sight is described as $$x/u=y/v=z/f,$$

where f is the focal length (FIG. 3). Therefore, the 3D coordinate of a point (u, v) on a detected line on the image is $$((u/f)*t,(v/f)*t,t),$$

where t is the depth of the point from the camera. Since this point is on the laser plane, we obtain $$a*(u/f)*t+b*(v/f)*t+c*t+1=0,$$

by substituting the 3D coordinates into the equation of the laser plane.

We have three unknown variables for the laser plane and one for the depth in the above equation. Therefore, the number of unknowns is 3*n+m when we have n lines and m intersections. In terms of the number of equations, we obtain two equations from each of the intersections if we assume that each of the intersections are intersections of two lines. So, we have 2*m equations. Therefore, a necessary condition so that the simultaneous equations are solvable is 3*n+m<=2*m, which can be simplified to 3*n<=m. (FIG. 4, FIG. 5)

For example, if we project laser lines so that they form a six(vertical)-by-six(horizontal) grid pattern, then n=12 and m=36; therefore, we can solve the simultaneous equations. In this case, letting the i th equation of the vertical laser line be $$avi*x+bvi*y+cvi*z+1=0, \quad (1)$$

letting the j th equation of horizontal laser line be $$ahj*x+bhj*y+chj*z+1=0, \quad (2)$$

and letting the depth of the intersection between the i th vertical laser line and the j th horizontal laser line be tij, then, we can obtain the simultaneous equations as follows:

$$avi*(uij/f)*tij+bvi*(vij/f)*tij+cvi*tij+1=0 \quad (3)$$

$$ahj*(uij/f)*tij+bhj*(vij/f)*tij+chj*tij+1=0 \quad (4)$$

where (uij, vij) is the intersection between the ith vertical laser line and the jth horizontal laser line for (1<=i,j<=6). The unknown variables are avi, bvi, cvi (1<=i<=6), ahj, bhj, Chj (1<=j<=6), and tij (1<=i,j<=6).

The maximum number of intersections of n lines is calculated as m=n*(n−1)/2. Thus, the minimum number of lines so that the equations are solvable is seven.

An example of implementations of real systems follows. The target object is captured by an image capturing device while lines are projected on the target using a line laser projector. Multiple images are captured while moving the line laser projector. From the images, common points where multiple lines are drawn are detected as intersections.

We can increase the accuracies of the detection of the lines by scanning radially from the observed position of the laser beam exit window of the laser light source. The positions of the window can be detected in the images by, for example, attaching a marker (for example an LED) at the window and detecting the marker in the images.

More specifically, it is preferable to search for peaks on the lines which are scanning trajectories defined as radial lines from the LED positions detected on the image. This increases the accuracies of detection of the lines compared to a simple thresholding, and detection of the lines with subpixel precision can be achieved (FIG. 6).

The number of unknown parameters of the laser planes can be reduced using a laser projecting device developed by aligning multiple line lasers at specific positions, because relative positions of line lasers are known. Therefore, we can solve the equations with fewer intersections.

For example, if we use a laser projecting device consisting of two line lasers aligned precisely at 90 degrees, which projects a crisscross pattern, the freedom of the unknown parameters is five, while the number of the plane parameters of the laser planes are six. This is because the constraint of orthogonality between the planes reduces the degrees of freedom. In this case, let the number of captured crisscross patterns be n and the number of intersections, including the centers of the crisscross patterns, be m, then, the necessary condition for the equation to be solvable is $5*n+m<=2*m$. This leads to $5*n<=m$ (FIG. 7).

For example, if we move the laser projecting device projecting the crisscross pattern along a slanted line so that the lines form a five(vertical)-by-five(horizontal) grid, then the equation can be solved since n=5 and m=25. In this case, the constraint equations are $$avi*(uij/f)*tij+bvi*(vij/f)*tij+cvi*tij+1=0 \quad (5)$$

$$ahj*(uij/f)*tij+bhj*(vij/f)*tij+Chj*tij+1=0, \quad (6)$$

for ($1<=i,j<=5$), and $$avi*ahi+bvi*bhi+cvi*chi=0 \quad (7)$$

for ($1<=i<=5$).

We can make a laser projecting device composed of more line lasers. If the relative positions between these line lasers are known, the number of the unknown parameters is 6+n, which is independent of the number of lines n. Thus, the necessary condition for solving the simultaneous equations is $6+m<=2*m$, where m is the number of intersections. Thus, we can solve the equations if we have at least six intersections. Since the maximum number of intersections of n lines is $m=n*(n-1)/2$, the minimum number of line lasers on the laser projecting device necessary for the simultaneous equations to be solvable is four.

Therefore, using the above configuration, we require only a single image to obtain 3D positions of the intersections and the laser planes. Even in this case, we can obtain the 3D shape of the object more effectively by repeating the series of measurement process while moving the laser projecting device.

In case of using multiple line lasers, there may be at least one or multiple intersections in a single image, and thus, each intersection should be identified. To do this, there are two methods can be considered, one is identifying each of the lines, the other is identifying each of the intersections.

To identify each of the lines, we can use lasers that have different colors (frequencies), or we can modulate the line laser beam to form, for example, a dotted line. Other ideas to do this are (1) using line lasers with different widths, (2) using line lasers with different intensities, and (3) using line lasers that blink at different frequencies.

In case that all the surface to be measured on the target object is visible from the camera, the topological relations of the intersections on the object are preserved in the captured image. Thus, the lines can be identified.

One method to identify the intersection is projecting the point laser so that the projected laser beam is close to the intersecting line of the laser planes and searching for the intersection near the projected point. It is more preferable to project the laser pointer so that the projected laser beam precisely coincides with the intersecting line of the laser planes using a mechanism such as half mirror.

The identification of the intersections can be done by using different colors or intensities of the point lasers.

Another method to identify the intersections is a brute-force search method, in which the simultaneous equations with all the combinations of the intersections are solved and the most appropriate answer is selected.

In this case, the search space can be reduced and an efficient search can be achieved if there are symmetries in the projected pattern.

On the other hand, intentionally reducing the symmetries by, for example, distorting angles of the polygon-shaped projected pattern may be preferable for validation of the solutions.

Once the intersections are identified, we may track each of the intersections.

Another idea is that, by attaching markers such as LEDs on specific positions of the laser projecting device and observing them from the camera, additional constraints of the position of the laser projecting device are obtained and the necessary number of intersections may be reduced.

For example, there are five degrees of freedom for the position of the laser projecting device composed of a pair of laser planes aligned perpendicularly. However, by observing a marker attached on the laser projecting device, the degrees of freedom reduces to four.

Another example; there are six degrees of freedom for the position of a laser projecting device composed of three or more line lasers aligned so that all the laser planes intersects at one point. The degrees of freedom reduce to four by observing a marker attached on the laser projecting device.

Once the simultaneous equations are solved, the 3D points of the intersections can be directly obtained.

By using the estimations of the parameters of the laser plane, which are the answers of the simultaneous equations, we can obtain the 3D locations of all the points lit by the laser by applying triangulation.

This concludes the detailed explanation of the algorithm shown in FIG. 2.

By repeating the above process, the 3D shape of the target object can be obtained. In this situation, a point on the shape may be repeatedly measured, therefore, we can calculate average depth of the point in order to merge the multiple measurements into a single shape.

Another efficient method is selecting the values with the highest probabilities assuming normal distributions.

Another method evaluates the certainty of each measured depth of a point and estimates the depth by using methods such as Bayes estimation.

After all the measurement processes are finished, the observation errors can be reduced with respect to the 3D positions of the points on the surface of the target object and the 3D positions of the laser planes by an iteration method (FIG. 8).

In the iteration method, let us define variables to be parameters of the laser planes and depth values of the surface of the target object, and let us define initial values of the variables to be the estimated values obtained in the processes described above.

The 3D positions of the points lit by the laser can be estimated from the positions (step S84) (8-4) of the reflections detected on the images (i.e. the line) and the positions (step S83) (8-3) of the laser planes stored in said variables. Let error e be the differences between the estimated depths and the depth values (step S85) (8-5) stored in said variables. The laser plane positions are reestimated so that the e is minimized (reestimation of the laser planes) (step S86) (8-6). This estimation can be done by, for example, multi-regression of two variables.

The above process is repeated (step S89) for all the laser planes. As a result, the depth estimations of the object are updated (step S810) for the new positions of the laser planes (reestimation of the 3D shape).

After the reestimation of the 3D shape, the laser planes are estimated again (step S811).

The iteration described above is stopped if the positions of the laser planes (step S812) do not change anymore.

Instead of conducting the reestimation of the 3D shape and reestimation of all the laser planes alternately for each iteration of the described process, we can conduct reestimation of the 3D shape and reestimation of only one laser plane or certain number of the laser planes alternately.

The accuracies of the target shape can be improved by the above described process.

This method allows 3D measurement with only a single camera and a laser projecting device composed of at least one line laser, without either using a pair of cameras, using precision mechanical motors, using a precision laser sensor, or performing extrinsic calibrations (estimation of the relative positions between multiple cameras or between a camera and a light projector), as required for previous active 3D measurements. Thus, the usefulness is greatly improved.

This advantage is achieved without either fixing a relative position between a camera and a light source or extrinsic calibrations, because the relative position of the laser projecting device from the camera is calculated for each movement motion of the light source from the captured image.

DESCRIPTION OF THE PREFERRED EMBODIMENTS

Solution for Simultaneous Equations

Figure 1:
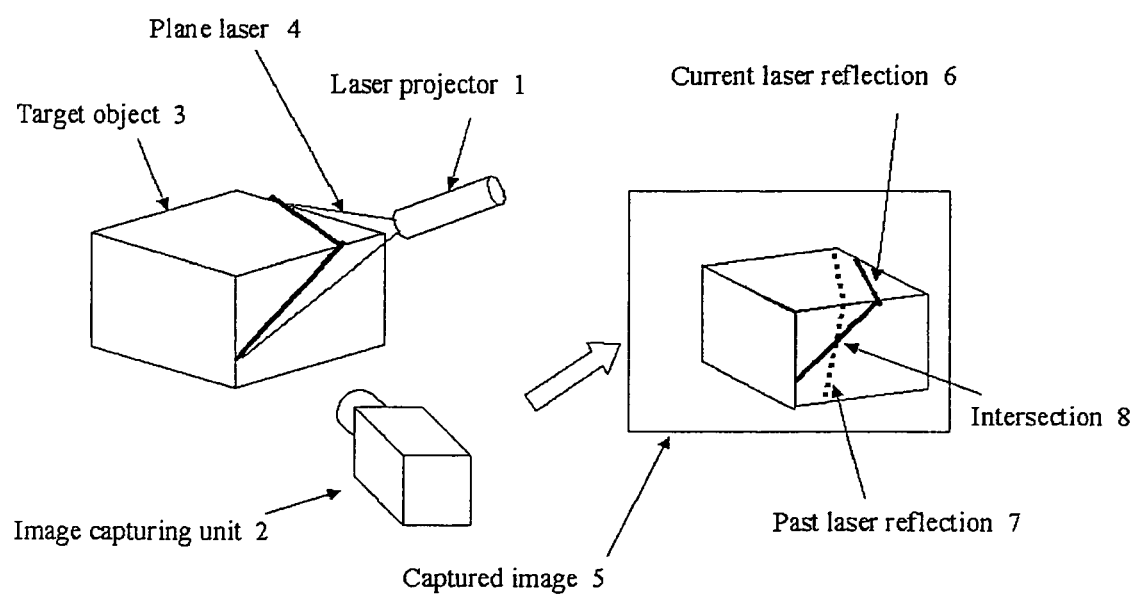
FIG. 1 illustrates the intersection between the laser reflection detected in the past frame and the laser reflection detected in a current frame captured by the image capturing device while a plane-shaped laser (laser plane) is projected from a laser projecting device to the target object.
Figure 2:
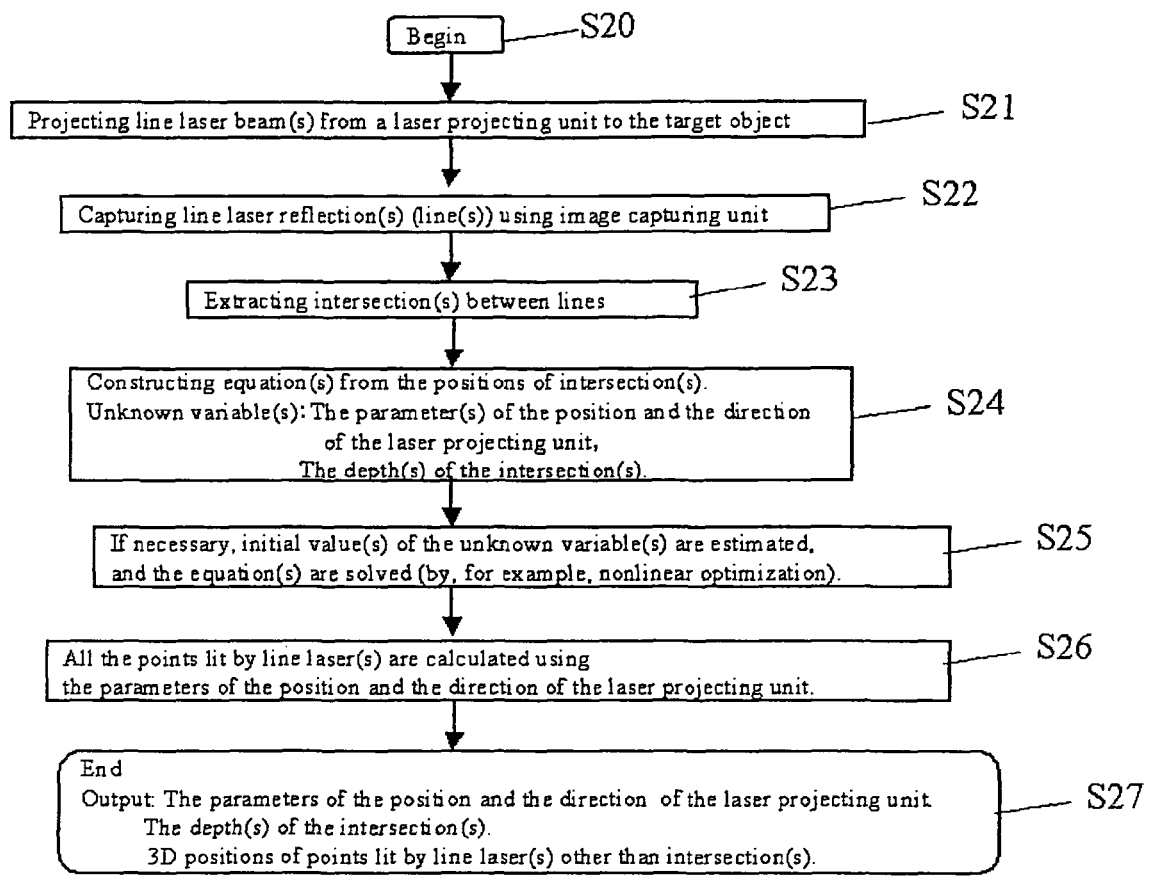
FIG. 2 is a flow diagram of an algorithm in which the 3D shape of the target object is measured by projecting patterns of laser light from the laser projecting device to the object.
Figure 3:
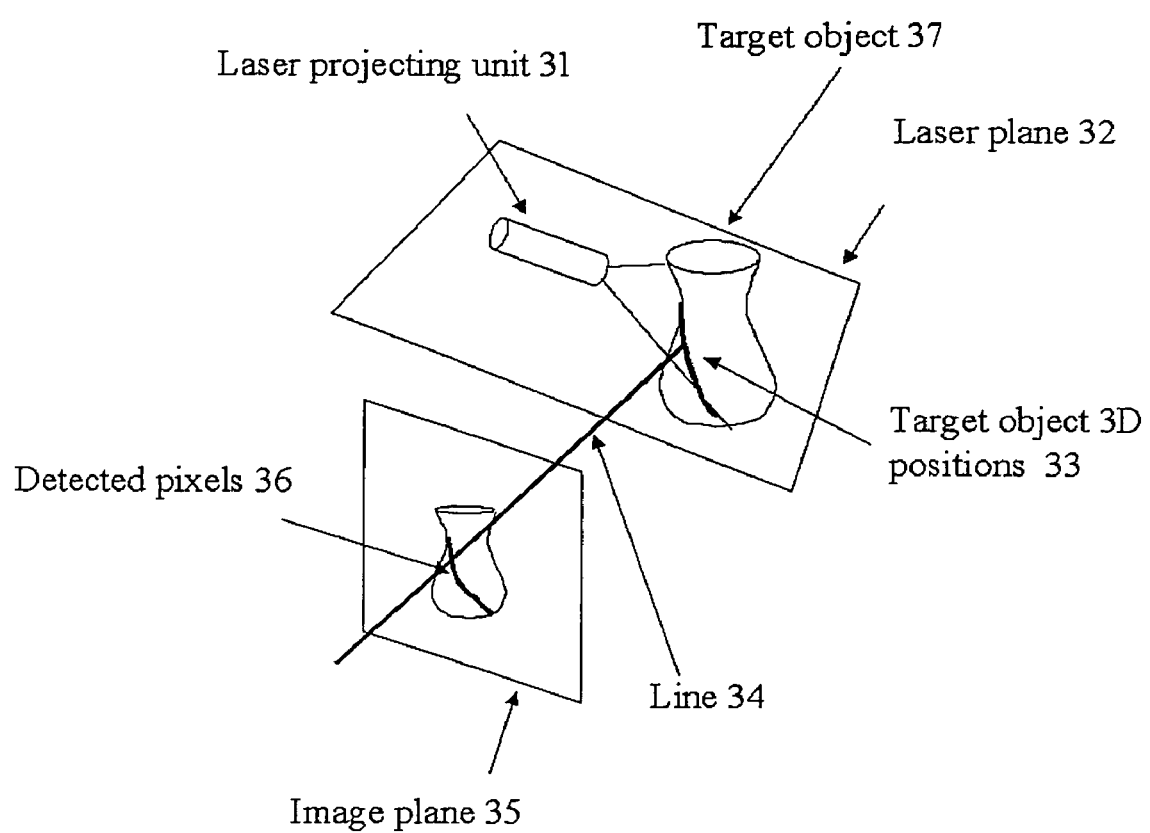
FIG. 3 illustrates a laser plane (32) (line laser beam from the laser projector passes through the laser plane), the line of sight (34), the image plane of the image capturing device (35), and their relationships.
Figure 4:
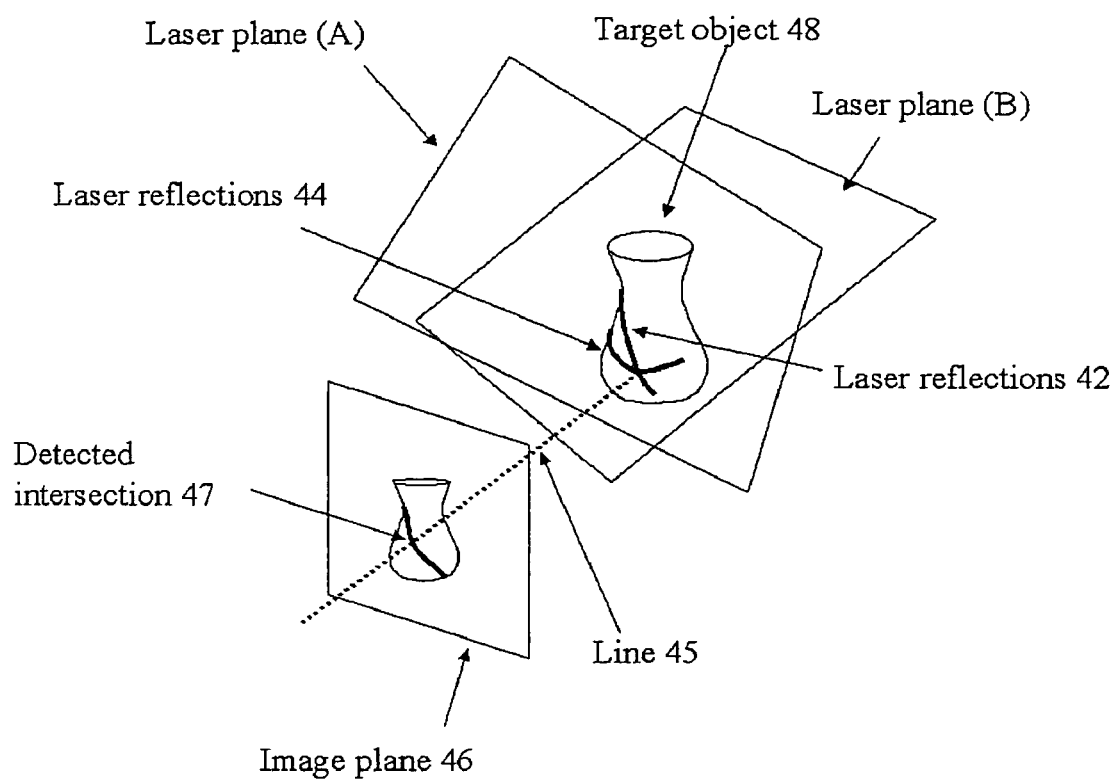
FIG. 4 illustrates lines, which are reflections of the two line lasers projected from the laser projecting device to the measuring target object, their intersection, the intersection projected on the image plane captured by the image capturing device, and the line of sight that goes through the intersection.
Figure 5:
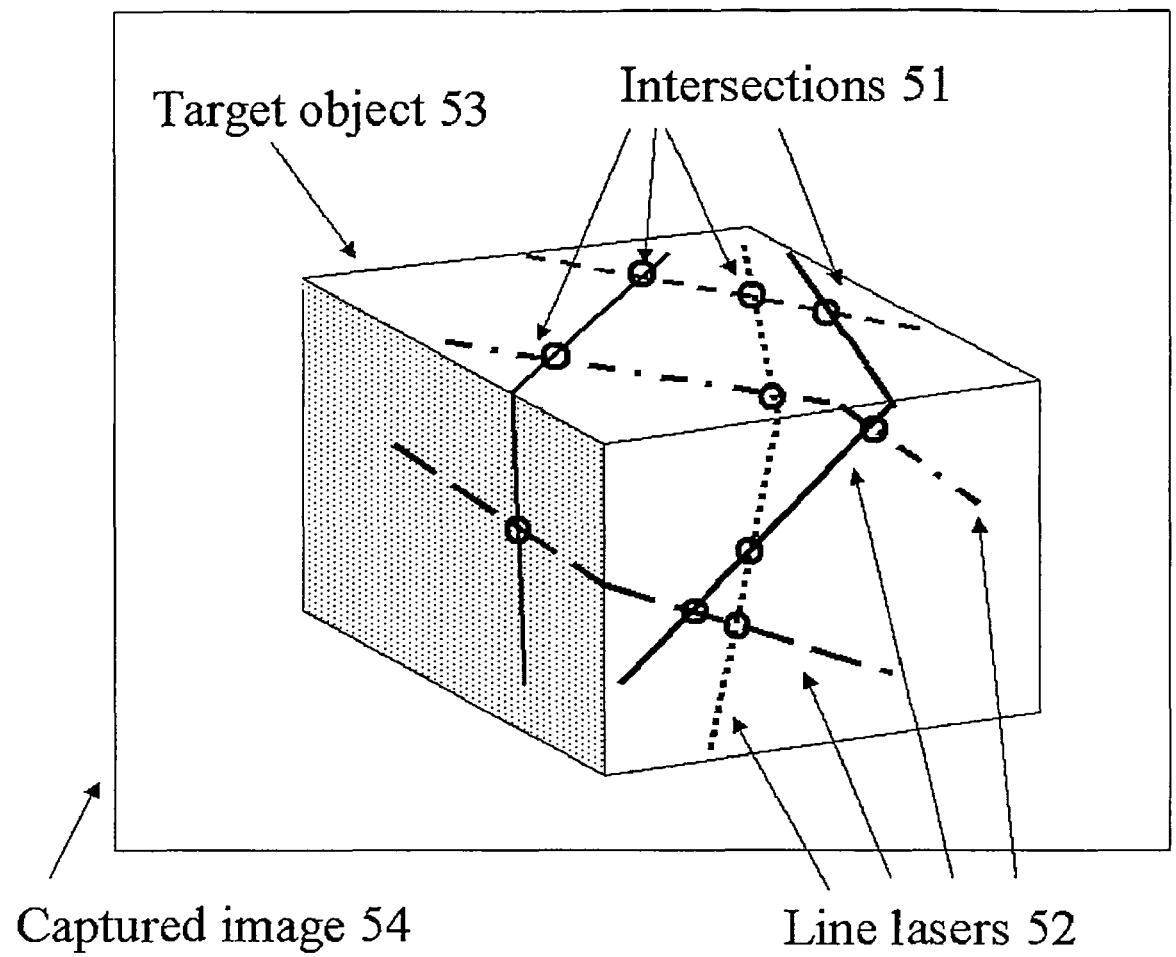
FIG. 5 illustrates the intersections of lines reflected on the target object on the image plane captured by the image capturing device while multiple line lasers are projected from a laser projecting device to the object.
Figure 6:
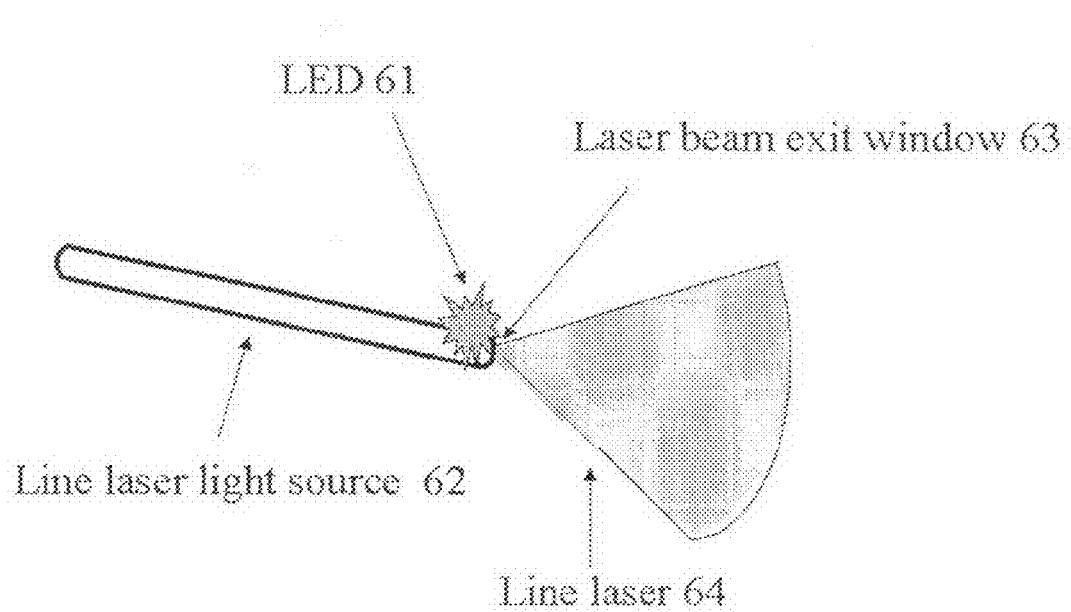
FIG. 6 illustrates how a marker such as an LED is attached near the laser beam exit window of the laser projecting device.

The simultaneous equations given by the intersections are nonlinear, thus, we need to solve nonlinear equations. For simple solution for the constraint equations described in the "Disclosure of the Invention", Newton's method can be used.

However, scales of errors of pixel positions of points on the image plane are often constant, therefore, from the aspect of precision, it is preferable to define functions to calculate the pixel positions of the intersections on the image plane using parameters of the laser planes and depth values of the intersections as unknown variables, and to minimize the sum of the squared errors between the calculated positions of the intersections and the observed pixel positions.

If there are further constraints between the planes, we can solve the equations by adding the values to the sum of the squared errors, the said values are squares of the equation that becomes zero when the additional constraints are fulfilled.

At this case, steepest descent method, conjugated gradient method, Newton's method, Quasi-Newton method, Gauss-Newton method, or Liebenberg-Marquardt method can be used for nonlinear optimization.

To retrieve the solution by an optimization method, it is more general to use three dimensional rotation and translation parameters of the position of the laser projecting device from the camera as unknown parameters, instead of using plane parameters as unknown parameters.

Especially, in case of using the laser projecting device which consists of multiple laser planes, whose relative positions are fixed for each other, we can remove constraints derived from the relative positions from the equations by applying this method. Therefore, it is preferable to use this method because error of the solution can be decreased and a more stable solution can be retrieved.

(Initial Value for Simultaneous Equations)

For nonlinear optimization method, initial values are required. Therefore, it is preferable to give good initial values by some method, e.g., we can consider a method in which we define specific values as the initial values of the laser plane positions in advance and move a laser plane close to the pre-determined positions during measurement.

For example, in case of using a laser projecting device which consists of two line-lasers, which is configured to project a crisscross pattern, the precision of the solution of nonlinear optimization is expected to improve by pre-determining the motion of the device from the down-left position to the upper-right position such that the laser lines form a grid pattern and providing the initial values that are similar to the pre-determined motion in advance.

For another example, it is also favorable to put multiple markers on the laser projecting device, observe them by camera, calculate the positions of the laser planes from the markers' positions, and use the positions of the laser planes as the initial values.

In this case, even if the markers are captured in only a part of the image sequence instead of all the image sequence, it is highly expected that precision of the solution can be improved by using the position of the laser plane of the image in which the markers are captured as the initial value.

If we assume a weak perspective projection for a camera model, then the equations are linear and they can be solved linearly, and thus, we can significantly simplify the calculation. In this case, the retrieved solution is based on the approximated model, therefore, by using the solution as an initial value, we can improve the precision of the solution by applying the nonlinear optimization method.

(Alternatives for Markers by Reflector)

It is allowable to use a reflector instead of an LED for a marker attached to the laser projecting device.

(Light Source)

For light sources, not only laser light sources, but also strobe lights or halogen lamps are allowable. To the contrary, shadow made by a strong light source (e.g. laser, strobe light, halogen lamp or sunlight) is also allowable.

(Configuration of Multiple Lasers)

Figure 7:
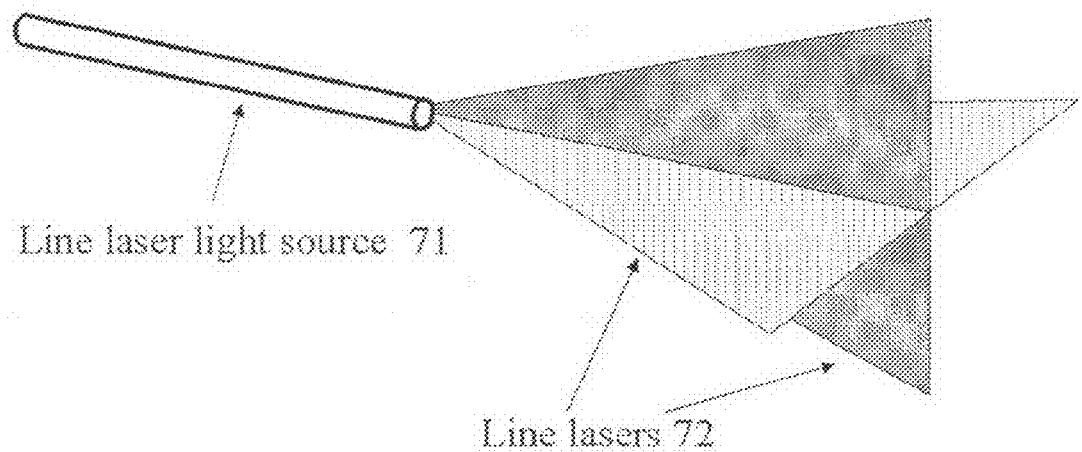
FIG. 7 illustrates how a laser projecting device composed of multiple line lasers projects multiple laser planes.
Figure 8:
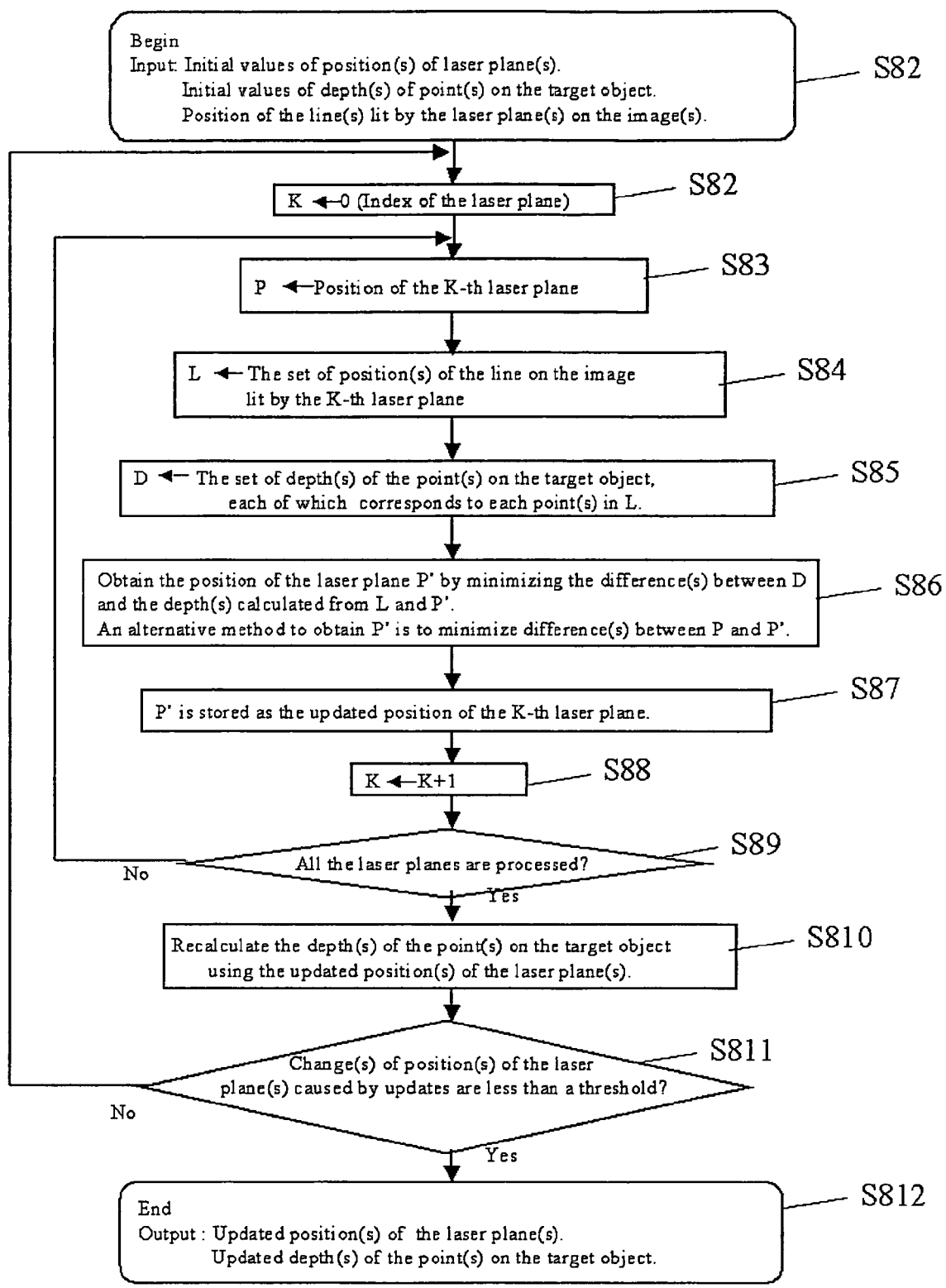
FIG. 8 is a flow diagram of an algorithm that estimates the positions of laser planes and the depth values of the surface of the target object from the initial positions of the laser planes, the previous depth values, and the positions of the lines detected on the image plane.

In case of using two lasers for utilization of multiple lasers as described above, it is preferable to configure those laser planes to be orthogonal in 3D space, because identification of the laser planes is not required in this case (FIG. 7).

Figure 9:
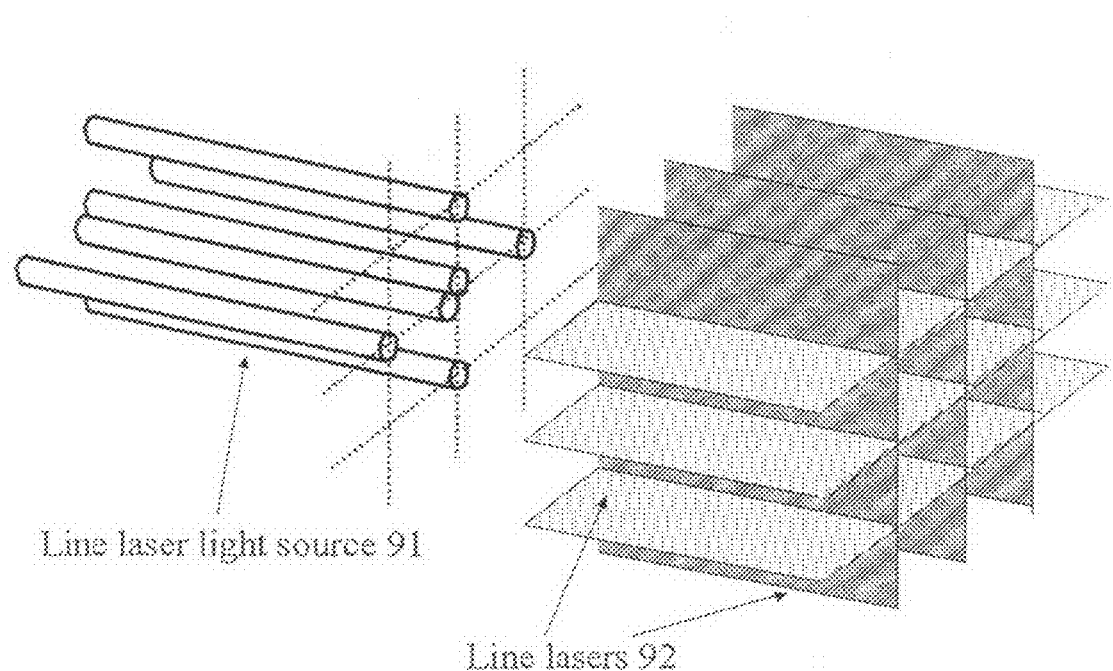
FIG. 9 illustrates how multiple line lasers are arranged so that the projected pattern of the reflections forms a grid pattern.
Figure 10:
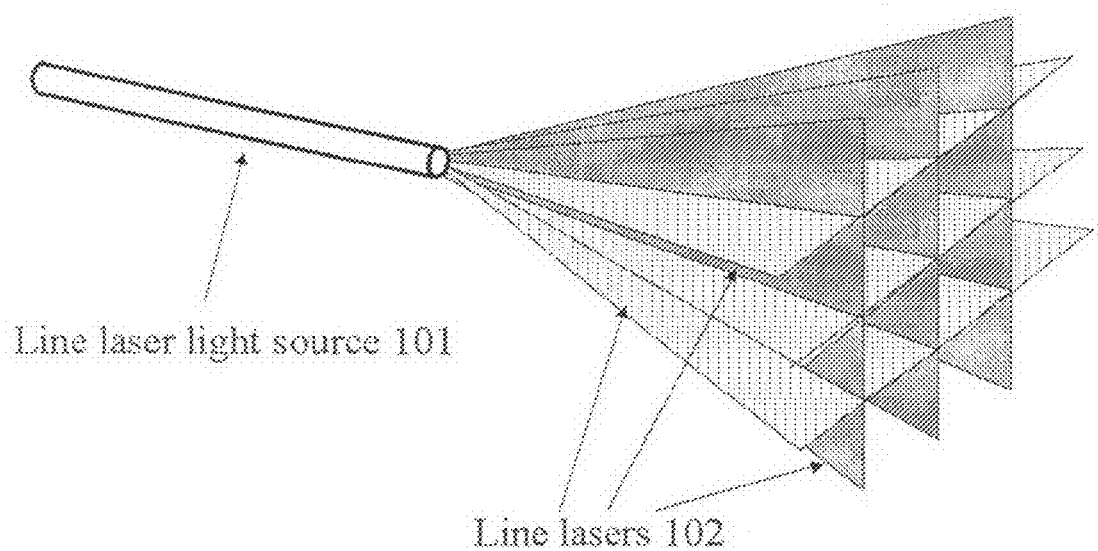
FIG. 10 illustrates how multiple line lasers are arranged so that their laser planes meet at one point and the projected pattern forms a grid.
Figure 11:
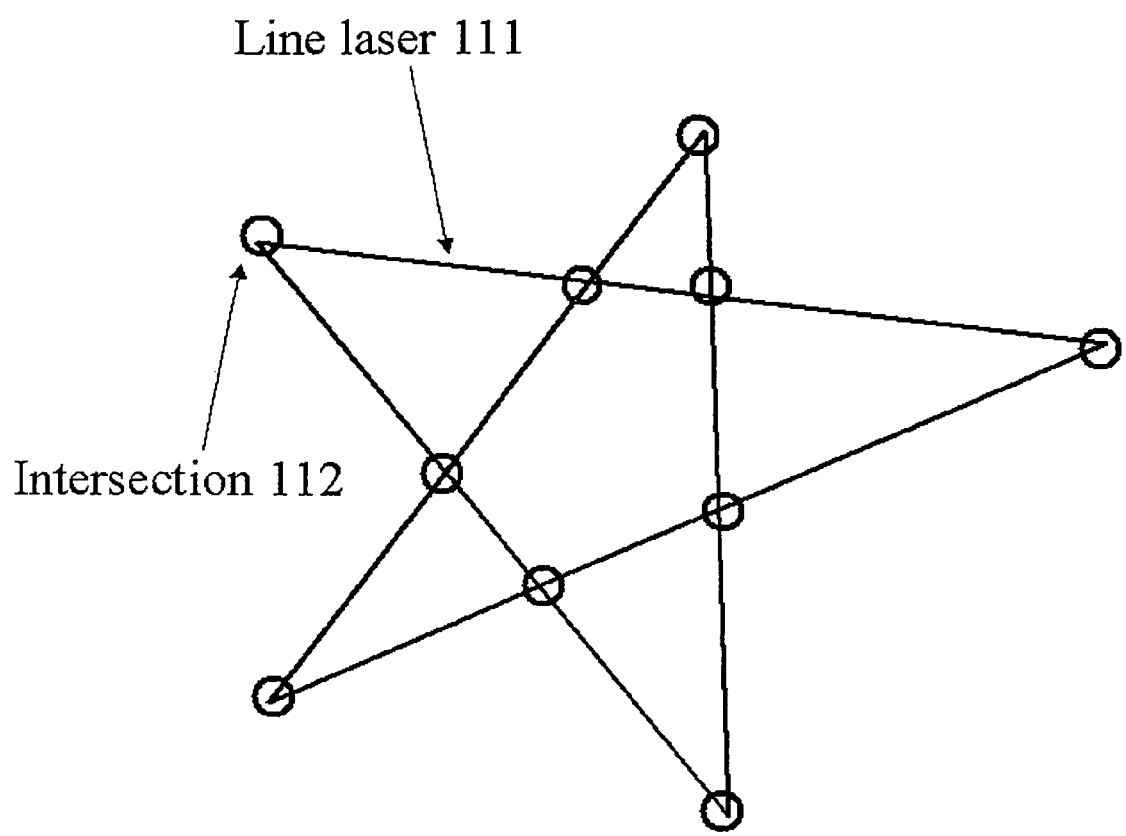
FIG. 11 illustrates how five line lasers are arranged so that the projected patterns form a shape of a star.

It is favorable to configure laser planes as lattice-like arrangement in order for all the horizontal planes of the lattice to be parallel and all the vertical planes of the lattice to also be parallel, because, in this case, relative positional relationships can be easily and precisely represented by the equations. In order to recover the shape from a single image with this configuration, at least five lines are required (FIG. 9).

In order to measure various sizes of objects, it is preferable to configure laser planes as a lattice-like arrangement and all the laser planes to meet at one point, because, in this case, the grid size varies depending on the distance from the point.

In case of using five lines, it is efficient to configure them to form a shape of a star, because it achieves the maximum number of intersections. (FIG. 1)

A manufacturing merit is huge if half-mirrors or prisms are used in order to split a single laser light source to multiple lasers.

It is highly efficient to use neighboring parallel slits, because it can produce multiple parallel lines easily. In addition, it is significantly efficient to use diffraction grating, because it can produce a grid-like pattern easily.

(Shape of Laser Line)

In terms of laser lines, circular lasers are allowable instead of straight line lasers. In case of straight line lasers, two lines have only one intersection; however, in case of circular lasers, two circles can have two intersections, and thus, a number of required lasers to acquire the necessary number of intersections can be significantly reduced.

Figure 12:
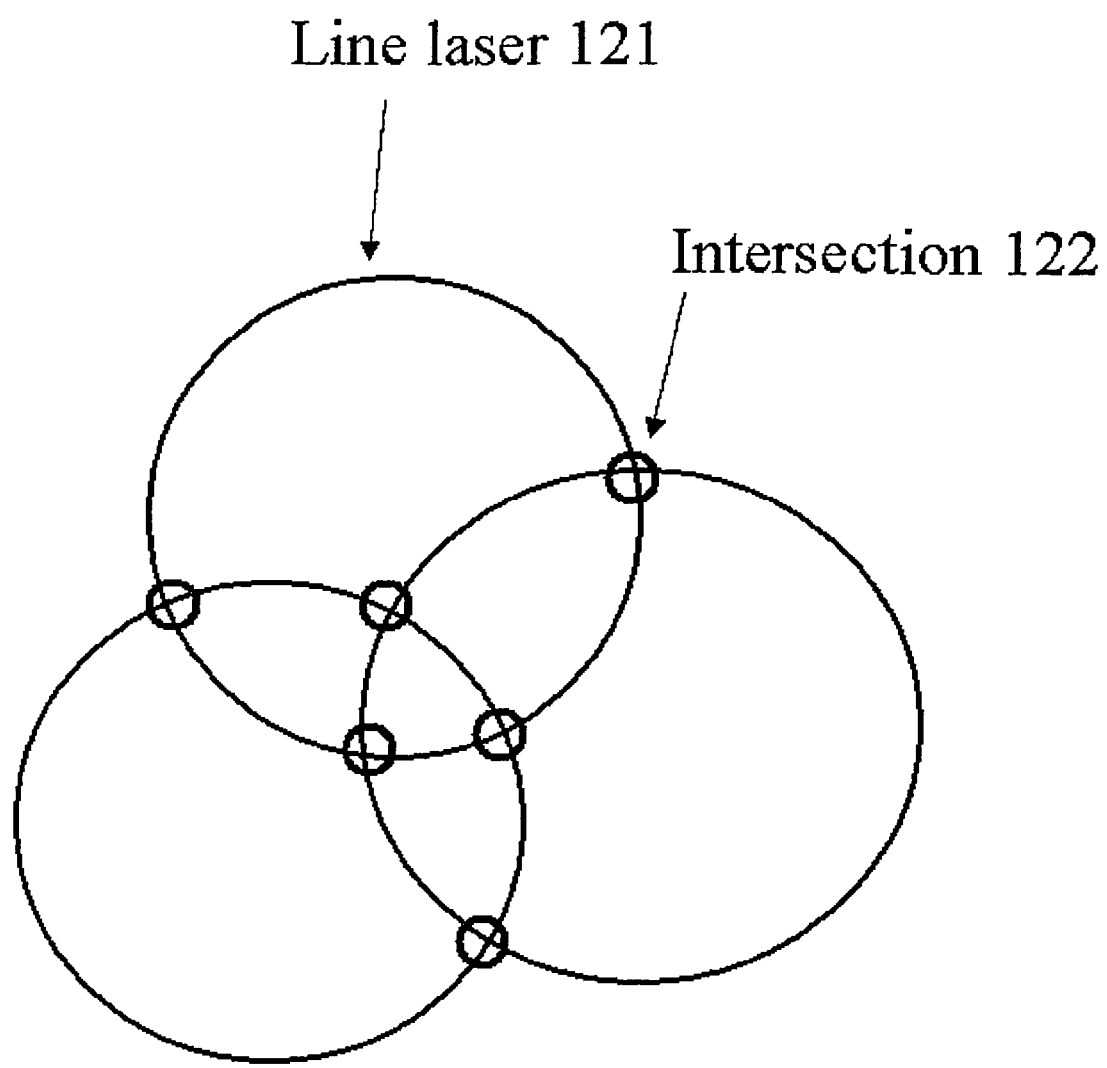
FIG. 12 illustrates how multiple lasers that project patterns of circles are combined into a laser projecting device.

In addition, practical merits of circular and elliptical lasers are high, because it can be easily manufactured by using two dimensional oscillators. (FIG. 12)

By utilizing more complicated cyclic patterns, we can drastically reduce the necessary number of lasers.

Instead of line laser light sources, it is allowable to use one or multiple laser pointers so that the laser beam goes through intersecting lines of line lasers.

(How to Move Line Laser Light Source)

If the line laser projecting device is held by hand and waved freely, additional mechanical devices are not necessary, and thus, there is a merit for cost and portability.

On the other hand, if it is waved automatically by, for example, motors, it is possible to achieve high precision measurement by solving simultaneous equations of constraints derived from the mechanical freedom of the motors.

(Image Capturing Device and Method)

For the image capturing device, it is convenient to use a camera, a digital camera, a CCD, or a video camera.

It is more preferable to equip an image capturing device with a filter that passes the wavelength of the laser, because efficient detection of the laser lights can be achieved.

If a filter which can control the passing band of wavelength is used, it is highly efficient, because multiple lasers with neighboring wavelength can be efficiently identified by changing the passing band while measurement.

(Calculation Method)

It is suitable for the purpose if a computer is used for the above described process, because high speed processing can be achieved. It is more suitable if a parallel processing computer is used, because high speed processing can be achieved.

INDUSTRIAL USABILITY

As explained above, applying this invention, the position of the laser projecting device composed of at least one line laser can be calibrated online by capturing the reflection of the laser lines while the laser projecting device is moved freely by hand. As a result, the 3D coordinates of the points where the lasers reflect are calculated continuously.

Therefore, an easy measurement of a huge object, such as the Pyramid, which can not be easily measured thus far can be possible.

By contrast, narrow space like the surfaces inside a mouth, where measurement devices can not be carried in, can be also measured.

In addition, it can be used for difficult situations where a human cannot get inside or complicated machines can not be carried in, such as an inside of an atomic reactor.

The invention claimed is:

1. Apparatus for shape measurement, comprising:
    (a) a laser projecting device, said device comprising at least one line laser light source,
    (b) a single image capturing device and
    (c) a computer, said computer including:
        means for detecting at least one intersection from an image sequence captured by said image capturing device fixed stationarily while moving said laser projecting device, said intersection being lit by the at least one line laser light source on at least one image;
        means for providing a plurality of equations, said equations being derived from the fact that a line of sight and a laser plane meet at the intersection by using unknown parameters of 3D position of the intersection and the laser plane, said laser plane being a plane representing said at least one line laser light source; and means for calculating the 3D position of the intersection and 3D position of the laser plane by solving simultaneous equations made of said plurality of equations by a nonlinear optimization method.

2. The apparatus defined by claim 1, the computer further comprising:

means for calculating a 3D position of the point lit by the laser projecting device other than said intersection by triangulation using the calculated 3D position of said laser planes.

3. Apparatus for shape measurement, comprising:
(a) a laser projecting device, said device comprising multiple line laser light sources configured for specific relative position,
(b) a single image capturing device, and
(c) a computer, said computer including:
means for detecting at least one intersection from an image sequence captured by said image capturing device fixed stationarily while moving said laser projecting device, said intersection being lit by multiple line lasers on at least one image;
means for providing a plurality of equations, said equations being derived from the fact that a line of sight and a laser plane meet at the intersection by using unknown parameters of 3D position of the intersection and the laser plane, said laser plane being a plane representing said line laser; and
means for calculating the 3D position of the intersection and 3D position of the laser plane by solving the simultaneous equations made of said plurality of equations by a nonlinear optimization method.

4. Apparatus for shape measurement, comprising:
(a) a moveable laser projecting device, said device comprising a plurality of line laser light sources configured for specific relative position in order to make at least six intersections,
(b) a fixed single image capturing device, and
(c) a computer, said computer including:
means for detecting at least one intersection from an image captured by said image capturing device fixed stationarily, said intersection being lit by the plurality of line laser light sources on the image, or lit by at least one line laser light source of the plurality of line laser light sources multiple times on different images;
means for providing a plurality of equations, said equations being derived from the fact that a line of sight and a laser plane meet at the intersection by using unknown parameters of 3D position of the intersection and the laser plane, said laser plane being a plane representing said plurality of line light sources; and
means for calculating the 3D position of the intersection and 3D position of the laser plane by solving simultaneous equations made of said plurality of equations by a nonlinear optimization method.

5. The apparatus defined by claim 3, the computer further comprising:

means for calculating a 3D position of a point lit by the laser projecting device other than said intersection by triangulation using the obtained 3D position of said laser planes.

6. The apparatus defined by claim 3, wherein at least one marker is attached at a selected position on the laser projecting device, the computer further comprising:

means for imaging the marker by said image capturing device;
means for providing a further plurality of equations, said further equations being derived from the relative positional relationship between the line representing the marker direction and the laser plane by using the unknown parameters; and
means for solving simultaneous equations made of said plurality of equations and said further plurality of equations by a nonlinear optimization method.

7. The apparatus defined by claim 1, wherein multiple markers are attached at a selected position on the laser projecting device, the computer further comprising:

means for solving simultaneous equations made of said plurality of equations in terms of the unknown parameters by using a laser plane position as an initial value, and said laser plane position being calculated from said markers.

8. The apparatus defined by claim 1, the computer further comprising:

means for retrieving a 3D shape of the object by repeating the series of processes, said repeated processes including
measuring a 3D shape of the surface lit by said laser projecting device, and
moving said laser projecting device.

9. A method for shape measurement using at least one image as input, said image capturing at least one laser line projected on an object using a fixed image capturing device, comprising:
(a) detecting at least one intersection on said image, said intersection being lit by a plurality of moveable line laser light sources, or at least one line laser light source multiple times on different images;
(b) providing a plurality of equations, said equations being derived from the fact that a line of sight and a laser plane meet at the intersection by using unknown parameters of the 3D position of the intersection and the laser plane, said laser plane being a plane representing at least one line laser light source; and
(c) calculating the 3D position of the intersection and 3D position of the laser plane by solving simultaneous equations made of said plurality of equations by a nonlinear optimization method.

10. A method for shape measurement using at least one image as input, said image being captured by an image capturing device fixed stationary capturing:
(i) at least one laser line projected on the object; and
(ii) at least one marker being attached at a selected position on the laser projecting device, comprising:
(a) detecting at least one intersection from said image, said intersection being lit by multiple line lasers;
(b) providing a plurality of equations, said equations being derived from the fact that a line of sight and a laser plane meet at the intersection by using unknown parameters of 3D position of the intersection and the laser plane, said laser plane being a plane representing said line laser;
(c) detecting markers and providing another plurality of equations, said another plurality of equations being derived from the relative positional relationship between the line representing the marker direction and the laser plane; and
(d) calculating the 3D position of the intersection and 3D position of the laser plane by solving simultaneous equations made of said plurality of equations and said another plurality of equations.

11. A method for shape measurement, comprising the following steps of the method being performed by a computer:
 (a) step of using values as variables, said values being the 3D position of at least one of the laser planes and position of each point of 3D shape, said laser planes being defined in claim 1 and said 3D position being calculated in claim 1;
 (b) step of using the 3D position of at least one of the laser planes and 3D shape as initial values of said variables, said 3D position and 3D shape being acquired using the apparatus of claim 1;
 (c) step of defining an error value as the difference between the 3D position of each point of 3D shape and the position of each point of 3D shape stored in said variables, said 3D position of each point of 3D shape being calculated by using a position of laser reflection and a position of plane stored in said variables, said position of laser reflection being captured by the image capturing device; and
 (d) step of optimizing said variables of shape and planes by minimizing said error value.

12. The apparatus defined by claim 4, the computer further comprising:
 means for calculating a 3D position of a point lit by the laser projecting device other than said intersection by triangulation using the obtained 3D position of said laser planes.

13. The apparatus defined by claim 4, wherein at least one marker is attached at a selected position on the laser projecting device, the computer further comprising:
 means for capturing the marker by said image capturing device;
 means for providing a further plurality of equations, said further equations being derived from the relative positional relationship between the line representing the marker direction and the laser plane by using the unknown parameters; and
 means for solving simultaneous equations made of said plurality of equations and said further plurality of equations by a nonlinear optimization method.

14. The apparatus defined by claim 3, wherein multiple markers are attached at a selected position on the laser projecting device, the computer further comprising:
 means for solving simultaneous equations made of said plurality of equations in terms of the unknown parameters by using a laser plane position as an initial value, and said laser plane position being calculated from said markers.

15. The apparatus defined by claim 4, wherein multiple markers are attached at a selected position on the laser projecting device, the computer further comprising:
 means for solving simultaneous equations made of said plurality of equations in terms of the unknown parameters by using a laser plane position as an initial value, and said laser plane position being calculated from said markers.

16. The apparatus defined by claim 3, the computer further comprising:
 means for retrieving a 3D shape of the object by repeating the series of processes, said repeated processes including
  measuring a 3D shape of the surface lit by said laser projecting device, and
  moving said laser projecting device.

17. The apparatus defined by claim 4, the computer further comprising:
 means for retrieving a 3D shape of the object by repeating the series of processes, said repeated processes including
  measuring a 3D shape of the surface lit by said laser projecting device, and
  moving said laser projecting device.

18. A method for shape measurement, comprising the following steps of the method being performed by a computer:
 (a) step of using values as variables, said values being the 3D position of at least one of the laser planes and position of each point of 3D shape, said laser planes being defined in claim 3 and said 3D position being calculated in claim 3;
 (b) step of using the 3D position of at least one of the laser planes and 3D shape as initial values of said variables, said 3D position and 3D shape being acquired using the apparatus of claim 3;
 (c) step of defining an error value as the difference between the 3D position of each point of 3D shape and the position of each point of 3D shape stored in said variables, said 3D position of each point of 3D shape being calculated by using a position of laser reflection and a position of plane stored in said variables, said position of laser reflection being captured by the image capturing device; and
 (d) step of optimizing said variables of shape and planes by minimizing said error value.

19. A method for shape measurement, comprising the following steps of the method being performed by a computer:
 (a) step of using values as variables, said values being the 3D position of at least one of the laser planes and position of each point of 3D shape, said laser planes being defined in claim 4 and said 3D position being calculated in claim 4;
 (b) step of using the 3D position of at least one of the laser planes and 3D shape as initial values of said variables, said 3D position and 3D shape being acquired using the apparatus of claim 4;
 (c) step of defining an error value as the difference between the 3D position of each point of 3D shape and the position of each point of 3D shape stored in said variables, said 3D position of each point of 3D shape being calculated by using a position of laser reflection and a position of plane stored in said variables, said position of laser reflection being captured by the image capturing device; and
 (d) step of optimizing said variables of shape and planes by minimizing said error value.

20. A method for shape measurement, comprising the following steps being performed by a computer:
 (a) step of using values as variables, said values being the 3D position of at least one of the laser planes and position of each point of 3D shape, said laser planes being defined in claim 10 and said 3D position being calculated in claim 9;
 (b) step of using the 3D position of at least one of the laser planes and 3D shape as initial values of said variables, said 3D position and 3D shape being acquired using the method of claim 9;
 (c) step of defining an error value as the difference between the 3D position of each point of 3D shape and the position of each point of 3D shape stored in said variables, said 3D position of each point of 3D shape being calculated by using a position of laser reflection and a position of plane stored in said variables, said position of laser reflection being captured by the image capturing device; and (d) step of optimizing said variables of shape and planes by minimizing said error value.

21. A method for shape measurement, comprising the following steps performed by a computer:
(a) step of using values as variables, said values being the 3D position of at least one of the laser planes and position of each point of 3D shape, said laser planes being defined in claim 11 and said 3D position being calculated in claim 10;
(b) step of using the 3D position of at least one of the laser planes and 3D shape as initial values of said variables, said 3D position and 3D shape being acquired using the method of claim 10;
(c) step of defining an error value as the difference between the 3D position of each point of 3D shape and the position of each point of 3D shape stored in said variables, said 3D position of each point of 3D shape being calculated by using a position of laser reflection and a position of plane stored in said variables, said position of laser reflection being captured by the image capturing device; and
(d) step of optimizing said variables of shape and planes by minimizing said error value.

* * * * *